July 30, 1946.  O. W. RICHARDS  2,404,888
MICROSCOPE
Filed Oct. 28, 1943  2 Sheets-Sheet 1
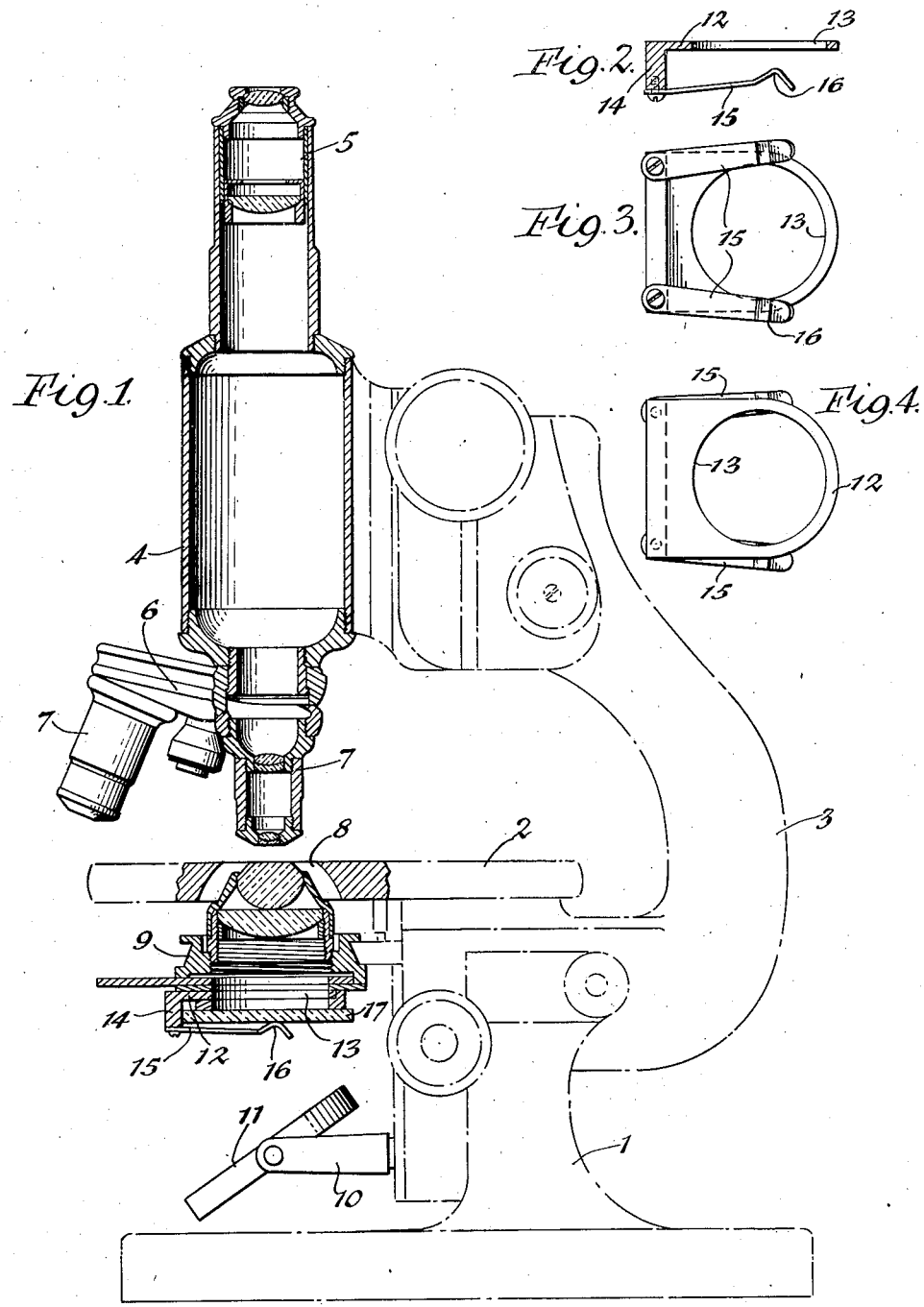
INVENTOR.
OSCAR W. RICHARDS
BY Raymond A. Paquin
ATTORNEY July 30, 1946.    O. W. RICHARDS    2,404,888
MICROSCOPE
Filed Oct. 28, 1943    2 Sheets-Sheet 2
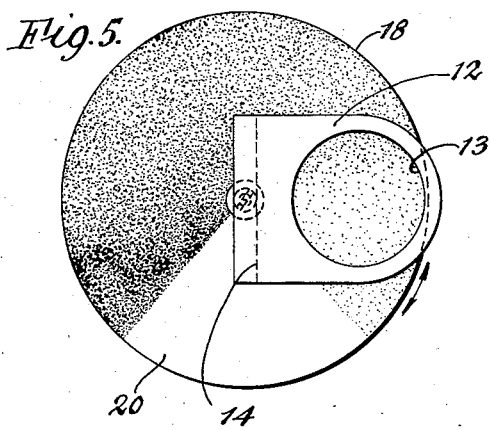
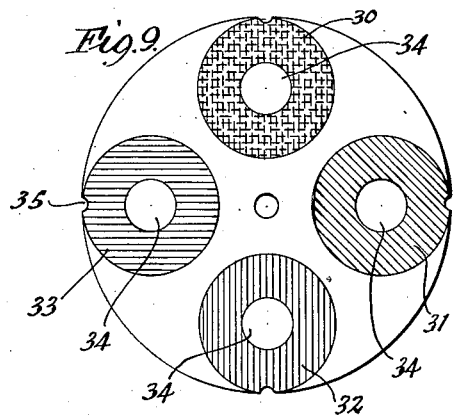
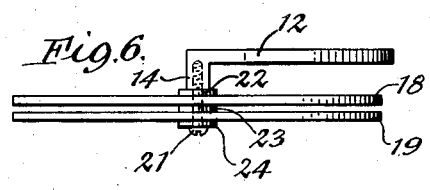
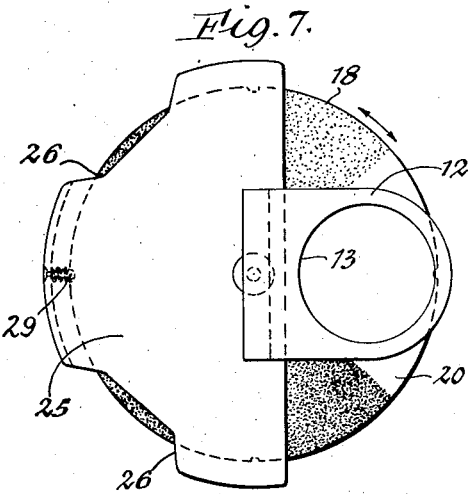
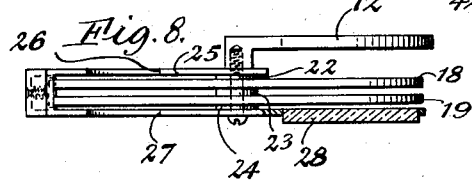
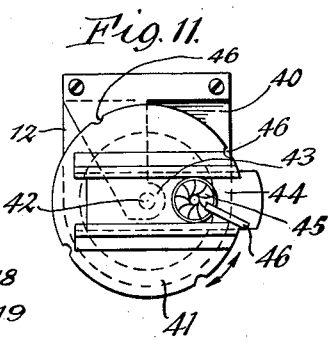
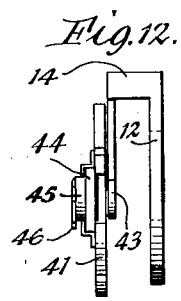
INVENTOR.
OSCAR W. RICHARDS
BY Raymond A. Paquin
ATTORNEY Patented July 30, 1946

2,404,888

UNITED STATES PATENT OFFICE 2,404,888

MICROSCOPE

Oscar W. Richards, Snyder, N. Y., assignor, by mesne assignments, to American Optical Company, Southbridge, Mass., a voluntary association Application October 28, 1943, Serial No. 507,959

6 Claims. (Cl. 88—40)

This invention relates to microscopes or the like and has particular reference to new and improved light control means for use therewith.

An object of the invention is to provide new and improved light control means for use with a microscope or the like and which permits the reduction of the light to the amount necessary for best vision without decreasing the resolving power of the instrument.

Another object of the invention is to provide light control means for use with a microscope or the like which may be easily and quickly applied to the instrument and therefore may be readily applied to instruments by the users thereof.

Another object of the invention is to provide new and improved light control means for a microscope or the like which allow the varying of the intensity of the light received by the instrument gradually over a wide range easily and quickly, during the use of the instrument and therefore allows the obtaining of the desired light.

Other objects and advantages of the invention will be apparent from the following description taken in connection with the accompanying drawings. It will be understood that many changes may be made in the details of construction and arrangement of parts without departing from the spirit of the invention as expressed in the accompanying claims. I, therefore, do not wish to be limited to the exact details of construction and arrangement of parts shown and described as the preferred form has been shown by way of illustration only.

Referring to the drawings:

Fig. 1 is a side view, partly in section, of a microscope embodying one form of the invention;

Fig. 2 is a sectional view of the form shown in Fig. 1 but showing the arrangement apart from a microscope;

Fig. 3 is a bottom view of the device shown in Fig. 2;

Fig. 4 is a top view of the device shown in Figs. 2 and 3;

Fig. 5 is a view of another form of the invention;

Fig. 6 is a side view of the form of the invention shown in Fig. 5;

Fig. 7 is a top view of an arrangement similar to that shown in Figs. 5 and 6 but having a cover member;

Fig. 8 is a side view of the form of the invention shown in Fig. 7;

Figs. 9 and 10 are top views showing the device adapted for light color control;

Fig. 11 is a top view showing the device adapted for the control of oblique light; and Fig. 12 is a side view of the device shown in Fig. 11.

In the past, light controls for use with microscopes have consisted of placing filters in front of the lamp which provides the illumination for the instrument. This has necessitated the provision of a number of filter members with each lamp which filters provide only a limited number of adjustments of the light which usually resulted in either too much light or too little light being provided in the microscope and in many cases it was not possible to adjust the light to the desired amount. Also, in the past, arrangements for control of oblique illumination were expensive and incorporated in the microscope condenser. Even though this illumination only had a limited use it was necessary for anyone desiring to use this form of illumination to obtain a new complete condenser which was expensive and further the oblique illumination provided by such condensers did not provide a circular beam but merely provided a beam of the shape of the part of the condenser which was not shut off by the adjustable diaphragm in the condenser.

It is, therefore, an object of this invention to provide simple, efficient and economical means for use with a microscope or the like whereby the light for the instrument may be accurately controlled without affecting the resolving power of the instrument. It is also an object of the invention to provide simple, efficient and economical means for providing oblique illumination for a microscope or the like.

Referring more particularly to the drawings wherein similar reference characters designate corresponding parts throughout the several views the microscope shown in Fig. 1 in conjunction with the invention comprises a base 1 supporting the stage 2 and upright arm 3. The upright arm 3 supports the body tube 4 which carries the eyepiece 5 and nosepiece 6 which in turn adjustably supports the objectives 7 each of which may be aligned with said body tube 4 to allow the viewing through the eyepiece 5 of objects supported on the stage 2.

The stage 2 is provided with an opening 8 in alignment with the body tube 4 and in alignment with said opening is provided the condenser member 9 which is removably supported on a vertically adjustable forked arm carried by the base 1. In alignment with the condenser and also carried by the base 1 is the vertically adjustable arm 10 on which is pivotally mounted the reflector or mirror 11 which is adapted to receive light from the usual microscope lamp, not shown, and direct said light through the condenser, specimen on the stage, objective in alignment with the body tube, then through said body tube into the eyepiece 5 where the observer may observe the specimen on the stage.

Attached to the microscope in Fig. 1 is shown a filter holder which is shown more completely in Figs. 2, 3 and 4. In this arrangement a supporting bracket 12 is provided which bracket is adapted to be slid into a horizontal slot 13 adjacent the lower end of the condenser 9 and which bracket also has a central aperture to allow light to pass therethrough. This bracket 12 has the downwardly extending portion 14 and adjacent the outer ends of this portion 14 are secured the resilient or spring clips or clamps 15. These clips 15 may be secured to the member 14 by screws as shown or by spot welding or soldering or by other suitable process as desired.

These resilient clips preferably have a bent portion 16 which allows the better supporting of filters 17 of various thicknesses.

It will be seen that this arrangement allows the filter holding member to be easily and quickly removed from the microscope for changing the filter and also allows the filter to be changed without removing the holder from the microscope as desired.

The form of the invention shown in Figs. 5 to 8 inclusive is much simpler to operate than that described above and also allows a much more accurate control of the illumination than is possible with the construction previously described. In this form the bracket 12 is employed with the downwardly extending portion 14.

Adjacent the center of said portion 14 is rotatably mounted a pair of disc members 18 and 19.

These discs 18 and 19 are in reality wedges oppositely mounted to provide even intensity over an area thereof. These discs are preferably of neutral gray and may be made by photographic or other suitable process. Each disc has a graduated transmission, for example, from fifty per cent to one per cent and also a clear portion 20.

Figs. 5 and 6 show a simple form of this construction and Figs. 7 and 8 show a more elaborate form thereof.

In the form shown in Figs. 5 and 6 the discs 18 and 19 are rotatably mounted on the member 14 by means of the screw or the like 21. The friction washer 22 is provided to make the disc 18 turn less easily than the disc 19 so that the disc 18 may be adjusted to get approximately the desired illumination and then the disc 19 adjusted for final adjustment of the light intensity. A separator 23 is placed between the discs 18 and 19 and a spring washer 24 is provided to give the proper spring tension.

In the more elaborate form shown in Figs. 7 and 8 a dust cover or shield 25 is provided. This cover or shield 25 is provided with cut out portions 26 to permit rotation of the discs 18 and 19. If desired this form could also be provided with a lower plate 27 which could have a filter 28 of heat resisting glass mounted in alignment with the aperture 13 in the bracket 12 to prevent heat from the light source from reaching and injuring the specimen under observation. If desired a stop 29 could be provided for normally locating the clear areas of the discs 18 and 19 in alignment with the path of light to the microscope.

Figs. 9 and 10 show discs containing colored filters for use in changing the contrast of colored objects. Such discs could be mounted on one disc such as that shown in Fig. 9 which contains for example a yellow filter 30, green filter 31, red filter 32 and blue filter 33. These discs should be a little larger than the opening in the microscope condenser.

Where the device is to be used for optical staining, said filters would be provided with the annular apertures 34 and a set of smaller colored discs as shown in Fig. 10 is provided to color the background in the well known optical staining method.

Both of the discs, in Figs. 9 and 10 should be provided with positioning notches 35 to locate the respective discs in alignment with the aperture 13 and microscope condenser.

In Fig. 10, the disc 36 could be yellow, the disc 37 green, the disc 38 red and the disc 39 blue, for example.

If desired the color filters and/or optical staining filters could be incorporated in a unit in conjunction with either the arrangement of Figs. 5 and 6 or 7 and 8. In such case the color filters should preferably be nearest the condenser and the neutral filters on the side of the color filters farthest away from the condenser.

The oblique light control attachment shown in Figs. 11 and 12 permits the use of a small beam of light from near the axis of the condenser to the outer edge of the condenser and also allows control of the size of the light beam and the rotation of the beam with respect to the axis of the condenser.

In this arrangement a bracket 40 is provided which bracket supports the disc 41 which disc is rotatable about a center 42. This center 42 is placed at the center of the condenser by the offset portion 43 on the support bracket 40.

The disc 41 is provided with the radial slot over which is mounted a slide 44 which is adapted to be moved parallel to the slot and on this slide 44 is mounted a small iris diaphragm 45. This iris diaphragm 45 is preferably small so that it may be moved as near the center and outer edge of the disc 41 as is mechanically possible.

If desired stops may be provided at both limits. The disc 41 should rotate at least 180 degrees. Also if desired indexing slots 46 may be provided in the periphery of the disc 41.

The slide 44 should be sufficiently large to prevent light passing through the slot in the disc 41 except through the iris diaphragm.

In view of the high light intensities ordinarily needed with oblique light there is probably little need for using the other features of this invention therewith but it is pointed out that this can be done if desired.

From the above it will be seen that I have provided simple, efficient, and economical means for obtaining all of the objects and advantages of the invention.

Having described my invention, I claim:

1. The combination with a substage condenser having below the lenses thereof a guideway for receiving a slide, of a perforated slide receivable in said guideway with the perforation aligned with the axis of said lenses, said slide carrying a pivot and a plurality of coaxial superimposed light wedges rotatably mounted on said pivot in optical alignment with said substage condenser and with said perforation.

2. The combination with a substage condenser having a guideway below the lenses thereof for receiving a slide, of a perforated support receivable in said guideway with the perforation aligned with the axis of said lenses, said support including a portion extending downwardly below said condenser and a light valve carried by said downwardly extending portion in optical alignment with said condenser.

3. The combination set forth in claim 2 in which said light valve comprises a pair of coaxial superimposed light wedges, said wedges varying in intensity in opposite directions about their common axis and cooperating with each other to adjust the intensity of illumination afforded by the substage condenser.

4. Oblique illumination for a microscope comprising the combination with a substage condenser of a light valve mounted on the side of said condenser toward the light source, said light valve comprising a pivot carried by the substage condenser with the axis thereof aligned with the optical axis of the condenser, a disc rotatably mounted on said pivot to underlie said condenser, and a slide carrying an iris diaphragm mounted on said disc to move said iris diaphragm toward and away from the optical axis of the condenser.

5. The combination with a substage condenser having a guideway below the lenses thereof for receiving a slide, of a support receivable in said guideway with an opening aligned with the axis of said lenses, said support including a portion extending downwardly below said condenser, fingers carried by said downwardly extending portion, and a light valve removably mounted in optical alignment with said condenser by said fingers.

6. The combination with a substage condenser having below the lenses thereof a guideway for receiving a slide, of a slide receivable in said guideway and having an opening aligned with the optical axis of said lenses, said slide carrying a pivot and a pair of coaxial superimposed light modifying members rotatably mounted on said pivot, one of said members carrying a plurality of annuli of different colors and the other of said members carrying a plurality of discs of contrasting colors, said respective members being rotatable to bring a selected annulus and a selected disc into registry in the optical path of said lenses to provide optical staining of the object under examination on the stage.

OSCAR W. RICHARDS.